US012746551B2

(12) United States Patent
Vyoral

(10) Patent No.: US 12,746,551 B2
(45) Date of Patent: Sep. 29, 2026

(54) GRATE PLATE FOR A PULP LIFTER OF A GRINDING MILL

(71) Applicant: METSO FINLAND OY, Espoo (FI)

(72) Inventor: Jakub Vyoral, Zlin (CZ)

(73) Assignee: Metso Finland Oy, Espoo (FI)

( * ) Notice: Subject to any disclaimer, the term of this patent is extended or adjusted under 35 U.S.C. 154(b) by 263 days.

(21) Appl. No.: 18/693,833

(22) PCT Filed: Sep. 23, 2022

(86) PCT No.: PCT/EP2022/076531
§ 371 (c)(1),
(2) Date: Mar. 20, 2024

(87) PCT Pub. No.: WO2023/046905
PCT Pub. Date: Mar. 30, 2023

(65) Prior Publication Data

US 2024/0390912 A1 Nov. 28, 2024

(30) Foreign Application Priority Data

Sep. 24, 2021 (SE) .................................... 2151173-8

(51) Int. Cl.
*B02C 13/284* (2006.01)
*B02C 17/18* (2006.01)
*B02C 17/22* (2006.01)

(52) U.S. Cl.
CPC ........ *B02C 13/284* (2013.01); *B02C 17/1825* (2013.01)

(58) Field of Classification Search
CPC .............. B02C 13/284; B02C 17/1825; B02C 17/1835; B02C 17/22; B02C 17/1855
See application file for complete search history.

(56) References Cited

U.S. PATENT DOCUMENTS 7,566,017 B2 * 7/2009 Latchireddi ......... B02C 17/1825 241/300
8,109,457 B2 * 2/2012 Latchireddi ......... B02C 17/1855 241/70
(Continued)

FOREIGN PATENT DOCUMENTS

AU 2013203877 B2 7/2015
CA 2221422 A1 5/1998
(Continued)

OTHER PUBLICATIONS

English translate (CN208679355U), retrieved date Jan. 15, 2026.*
(Continued)

*Primary Examiner* — Mohammed S. Alawadi
(74) *Attorney, Agent, or Firm* — Andrus Intellectual Property Law, LLP

(57) ABSTRACT

A grate plate for use with a pulp lifter at a discharge end of a grinding mill. The grate plate has a leading side edge and a trailing side edge that have complementary shapes so that a series of grate plates can be mounted to the pulp lifter in a circular or annular array. The grate plate further includes one or more sections of lifter bars arranged so that the lifter bar sections on a number of adjacent grate plates complement each other to form lifter bars. The lifter bar sections are shaped so that at least portions of the resulting lifter bars are inclined or curved in a first circumferential direction. At least portions of the complementary leading and trailing side edges of the grate plate are inclined or curved in a second circumferential direction of the array. The second circumferential direction is opposite the first circumferential direction.

15 Claims, 9 Drawing Sheets

(56) References Cited

U.S. PATENT DOCUMENTS

| | | | | |
|---|---|---|---|---|
| 2006/0283993 | A1 | 12/2006 | Latchireddi | |
| 2020/0298247 | A1* | 9/2020 | Latchireddi | B02C 17/1855 |
| 2024/0316567 | A1 | 9/2024 | Hudson | |

FOREIGN PATENT DOCUMENTS

| | | | | |
|---|---|---|---|---|
| CL | 2018001335 | A1 | | 8/2018 |
| CL | 2023002140 | A1 | | 4/2024 |
| CN | 101198410 | A | | 6/2008 |
| CN | 102740980 | A | | 10/2012 |
| CN | 204724262 | U | | 10/2015 |
| CN | 206215316 | U | | 6/2017 |
| CN | 108704722 | A | | 10/2018 |
| CN | 109351455 | A | | 2/2019 |
| CN | 208494442 | U | | 2/2019 |
| CN | 208679355 | U | * | 4/2019 |
| CN | 209715272 | U | | 12/2019 |
| CN | 209829140 | U | | 12/2019 |
| CN | 113117870 | A | | 7/2021 |
| CN | 114950654 | A | | 8/2022 |
| CN | 219092243 | U | | 5/2023 |
| RU | 188092 | U1 | | 3/2019 |
| WO | 199801226 | A1 | | 1/1998 |
| WO | 2011095692 | A1 | | 8/2011 |
| WO | 2017087992 | A1 | | 5/2017 |
| WO | 2018172594 | A1 | | 9/2018 |

OTHER PUBLICATIONS

Search Report and Examination Report for Chilean Patent Application No. 202400827, dated Aug. 28, 2025.

Office Action for Brazilian Patent Application No. BR112024005834-4, dated Sep. 9, 2025.

International Search Report and Written Opinion for International Application No. PCT/EP2022/076531, mailed Jan. 10, 2023.

International Preliminary Report on Patentability for International Application No. PCT/EP2022/076531, mailed Jul. 31, 2023.

Search Report for Swedish Patent Application No. 2151173-8, mailed Apr. 7, 2022.

Search Report and Examination Report for Chilean Patent Application No. 202400827, dated Dec. 16, 2025.

Office Action and Search Report for Chinese Patent Application No. 2022111665041, dated Apr. 27, 2026.

* cited by examiner

GRATE PLATE FOR A PULP LIFTER OF A GRINDING MILL

CROSS-REFERENCE TO RELATED APPLICATIONS

This application is the U.S. national stage application of International Application PCT/EP2022/076531, filed Sep. 23, 2022, which international application was published on Mar. 30, 2023, as International Publication WO 2023/046905 A1 in the English language. The International Application claims priority Sweden Patent Application No. 2151173-8 filed Sep. 24, 2021.

FIELD OF THE INVENTION

The present invention relates to a grate plate for use at a discharge end of a grinding mill. The invention further relates to a pulp lifter comprising such grate plates and to a grinding mill comprising a pulp lifter comprising the grate plates.

PRIOR ART

Grinding mills are used to grind mine ore or primary crusher product.

One type of grinding mills comprises a drum in which the material to be ground, i.e. the charge, is ground by rotating the drum. In some types of horizontal drum mills, called a ball mill or pebble mill, balls of hard material are introduced in the drum with the charge. When the drum is rotated, the charge is ground also by the action of impacts from the balls.

At the discharge end of the drum, typically a pulp lifter is arranged which comprises a plurality of radially orientated chambers which rotate with the mill in a vertical plane. Grate plates are provided to separate the pulp lifter chambers from the interior of the grinding mill. As the pulp lifter rotates, a slurry of ground material passes through apertures in the grate plates into the chambers of the pulp lifter and from there into a discharge trunnion of the mill. The grate plates are further provided with lifter bars on the surfaces facing the interior of the drum chamber.

For purposes of illustration, FIG. 7 schematically illustrates a grinding mill 1. This mill 1 comprises a cylinder or drum arranged to rotate its longitudinal axis and having a slurry feed trunnion 11 at one end and a discharge trunnion 12 at the other end. By the feed trunnion 11 and discharge trunnion 12 the mill is supported on bearings (not shown). The material 13 to be ground in the mill is fed into a grinding chamber of the mill 1 through the feed trunnion 11. Water is advantageously also fed into the mill 1 in order to create a wet grinding in the mill 1. The grinding takes place within the drum by lifting and dropping the material to be ground inside the drum. Lifter bars or lifter plates may be used for lifting the material inside the drum. According to an embodiment, loose grinding elements, such as balls comprising for instance stone or metal material, may be provided inside the drum to aid in grinding.

Between the grinding chamber and the discharge trunnion 12 of the mill 1, a framework is installed inside the mill 1 and supported to the body of the mill. The framework supports a pulp lifter that directs the ground material from the grinding chamber to the discharge trunnion 12 of the mill 1.

As is also apparent from FIG. 8 which is a front view of a pulp lifter of the prior art (i.e. as seen from inside the mill in the direction of the mill's longitudinal axis) according to WO 2011/095692 A1, an exemplary pulp lifter comprises several radially outer pulp lifter elements 200 forming an annular array, as well as a further array of transition discharger elements 300 and a central circular array of inner discharger elements 400. Each outer pulp lifter element 200 is equipped with a grate plate 220 (wherein in FIG. 8 only half of the circumference of the pulp lifter is shown with its grate plates for purposes of illustration), having slot shaped apertures 225 through which the ground material 13 passes and enters a slurry pocket of the pulp lifter element 200.

Typically, the center point of the pulp lifter is arranged on the longitudinal axis of the cylindrical drum of the mill 1.

In some instances, the disc-shaped pulp lifter may also comprise a conical shape with the center point of the pulp lifter being offset from the circumference of the pulp lifter towards the discharge end of the mill.

As also apparent from FIG. 7, at least one outer pulp lifter element 200 is at least partly immersed into the material 13 at a time during the operation of the mill 1.

FIG. 9 shows several adjacent outer pulp lifter elements 200 of a prior art embodiment in more detail. To each pulp lifter element, a grate plate 220 is fixed which has a substantially rectangular or trapezoidal external shape so that two external sides or edges 231, 232 of the grate plate 220 are essentially parallel, and two other external sides or edges 233, 234 are convergent to each other. The pulp lifter elements with the grate plates 220 mounted thereon are installed in the mill 1 so that the longer external side 232 of the two parallel sides 231 is radially outward of the shorter of the two parallel sides and is therefore closer to the inner circumference of the drum of the mill.

During operation of the mill 1, the mill 1 is rotated around its rotation axis and the pulp lifter elements 200 are one after another immersed into the ground or comminuted material 13. While a given pulp lifter element is immersed, some of the material 13 flows through the slot openings 225 in the grate plate 220 of this pulp lifter element 200 into a first section 202 (FIG. 8) of a slurry pocket of the pulp lifter element 200. The first section 202 of a leading pulp lifter element communicates with a second section 204 of the following pulp lifter element through transfer openings in a leading edge wall of the following pulp lifter element. As the pulp lifter rotates, the pulp lifter element 200 rises relative to the following pulp lifter element and slurry in the first section 202 of the leading pulp lifter element flows through the transfer openings into the second section 204 of the following pulp lifter element. As the pulp lifter continues to rotate, the slurry in the second section 204 of the following pulp lifter element 200 flows towards a discharge cone of the pulp lifter and further to the discharge trunnion 12 of the mill.

Turning now specifically to the configuration of the grate plates 220, grate plates with straight lifter bars are known specifically for grinding mills having a grinding drum rotating in both directions, like in the embodiments of FIGS. 8 and 9. In the embodiment of FIG. 9, each grate plate 220 has two rows of slot-shaped through holes 225.

A lifter bar 223, also called a grate lifter, is arranged between the two rows of slots 225 on the surface of the grate plate facing the grinding chamber of the grinding mill. The lifter bar 223 is for guiding particles of the ground material 13 into the pulp lifter element 200 through the openings 225 in the grate plate 220. This may take place in a manner similar to that of the slurry pockets in the pulp lifter element 200, i.e. the grate lifters 223 may lift the ground material 13 as the grate rotates. The lifter bars prevent excessive sliding of material over the grate plates, thereby reducing the wear of the grate plates.

Other arrangements of slots and straight lifter bars are known per se: for example, in the embodiment of FIG. 8, each grate plate 220 has one row of slots 225 and lifter bars 223 to either side thereof.

The grate plates 220 are attached to the pulp lifter elements 200 by way of mounting bolts 227.

Also known are grate plates with at least partially inclined or curved lifter bars, especially for grinding drums rotating in one direction. Embodiments are shown in FIGS. 10 and 11 (from CN 208679355 U): similar as in the first mentioned conventional embodiments, a series of grate plates 120 are circumferentially arranged in an annular array on the discharge end side of the mill to form a grate. However, in this case the lifter bars on the grate plates are not straight but arcuate, i.e. curved in the rotational direction of the drum. Also, the lifter bars are sectionalized across adjacent grate plates 120 so that a first portion 121 of a lifter bar is arranged on one grate plate and a second portion 122 of the same lifter bar is arranged on an adjacent grate plate, the two portions 121, 122 collectively forming a continuous arc-shaped lifter bar. Curved lifter bars may provide for an improved transportation and release of the ground material compared to straight lifter bars.

US 2020/298247 A1 and WO 2018/172594 A1 describe related pulp lifters with grate plates.

SUMMARY OF THE INVENTION

In conjunction with the grate open area, the pulp lifter determines the maximum volumetric throughput of the mill.

It is therefore an object of the present invention to provide a grate plate for a pulp lifter of a grinding mill which is designed to optimize the area available to provide slots.

According to a first aspect of the present invention, there is provided a grate plate for use with a pulp lifter at a discharge end of a grinding mill. The grate plate has an outer edge, an inner edge, a leading side edge and a trailing side edge. The leading side edge and the trailing side edge have complementary shapes so that a series of grate plates can be mounted to the pulp lifter in a circular or annular array, with the leading side edge of each grate plate being adjacent the trailing side edge of an adjacent grate plate in the array. The grate plate comprises openings for passing through ground material particles of a predetermined size or smaller from the interior of the drum towards the pulp lifter. The grate plate further comprises, on a surface configured to face the interior of the cylindrical drum, one or more sections of lifter bars arranged so that the lifter bar sections on a number of adjacent grate plates complement each other to form lifter bars, wherein the lifter bar sections are shaped so that at least portions of the resulting lifter bars are inclined or curved in a first circumferential direction of the circular or annular array relative to a radial line of the array intersecting the respective lifter bar or lifter bar portion. At least portions of the complementary leading and trailing side edges of the grate plate are inclined or curved in a second circumferential direction of the array relative to a radial line of the array running through the point of intersection of the respective side edge with the outer edge. The second circumferential direction is opposite the first circumferential direction.

According to a second aspect of the present invention, there is provided a pulp lifter for a grinding mill, the pulp lifter comprising a circular or annular array of pulp lifter elements, wherein a grate plate as described above is attached to each pulp lifter element.

According to a third aspect of the present invention, there is provided a grinding mill comprising a cylindrical drum arranged rotatably around its longitudinal axis, at least one inlet for receiving a continuous feed of material to be ground at least one outlet for continuous discharge of ground material, and a pulp lifter for guiding the ground material from the cylindrical shell to the discharge outlet, the pulp lifter comprising a circular or annular array of pulp lifter elements, wherein a grate plate as described above is attached to each pulp lifter element.

The invention is based on the idea of partitioning the grate plates forming the circular or annular array so that the side edges are at least partially inclined or curved in the direction opposite the rotational direction of the drum, whereas the lifter bars are inclined or curved in the rotational direction. This results in a larger surface area of the grate plate between the lifter bar sections being available to place the grate apertures.

An advantage of the arrangement of the invention is that a more efficient flow of material and lower power consumption per a unit of ground material produced can be achieved with a simple structure. Some further advantages are disclosed in the detailed description in connection with embodiments.

Optional features of the claimed grate plate, pulp lifter and grinding mill are recited in the respective dependent claims.

The grate plate may have having essentially the shape of a trapezoid, of a segment of a circle, or of a segment of an annulus.

The inner edge may be shorter than the outer edge.

In the grate plate, the leading side edge and the trailing side edge may each be configured from a first section adjacent to the outer edge of the grate plate, a second section adjacent to the inner edge of the grate plate, and a third section between the first and second sections, wherein the first and/or the second sections of the side edges extend essentially in a radial direction, and the intermediate sections of the side edges are inclined or curved in said second circumferential direction of the array relative to said radial line.

In an alternative, the leading side edge and the trailing side edge are each configured from a first section adjacent to the outer edge of the grate plate and a second section adjacent to the inner edge of the grate plate, wherein the first sections of the side edges are inclined or curved in said second circumferential direction of the array relative to said radial line, whereas the second sections of the side edges extend essentially in a radial direction.

The grate plate may comprise a first lifter bar section forming part of a first lifter bar of the array, a second lifter bar section forming part of a second lifter bar of the array, and a third lifter bar section forming part of a third lifter bar of the array.

The grate plate may comprise an array of apertures in an area between the first and the second lifter bar section, and another array of apertures in an area between the second and the third lifter bar section. The first and second arrays of apertures may have an essentially equal size and/or an equal number of apertures. The first and second arrays of apertures do not necessarily have to be equal in size and/or number of apertures, though—for example, the number of apertures in a radially more outward area could be a larger number depending on curvature.

The first circumferential direction in which the lifter bars are curved or inclined may be a rotational direction of the pulp lifter.

The invention also provides a plurality of the above described grate plates having complimentary side edges and being configured to form a circular or annular array. The grate plates may all have an identical shape. The plurality of grate plates may comprise between 18 and 32 grate plates.

The pulp lifter may comprise at least two circular or annular arrays of pulp lifter elements wherein the grate plates are attached to the pulp lifter elements of a radially outer array of pulp lifter elements.

In the grinding mill, the longitudinal axis of the drum may extend in a horizontal direction.

BRIEF DESCRIPTION OF THE DRAWINGS

The above, as well as additional objects, features and advantages of the present invention will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

Figure 1A:
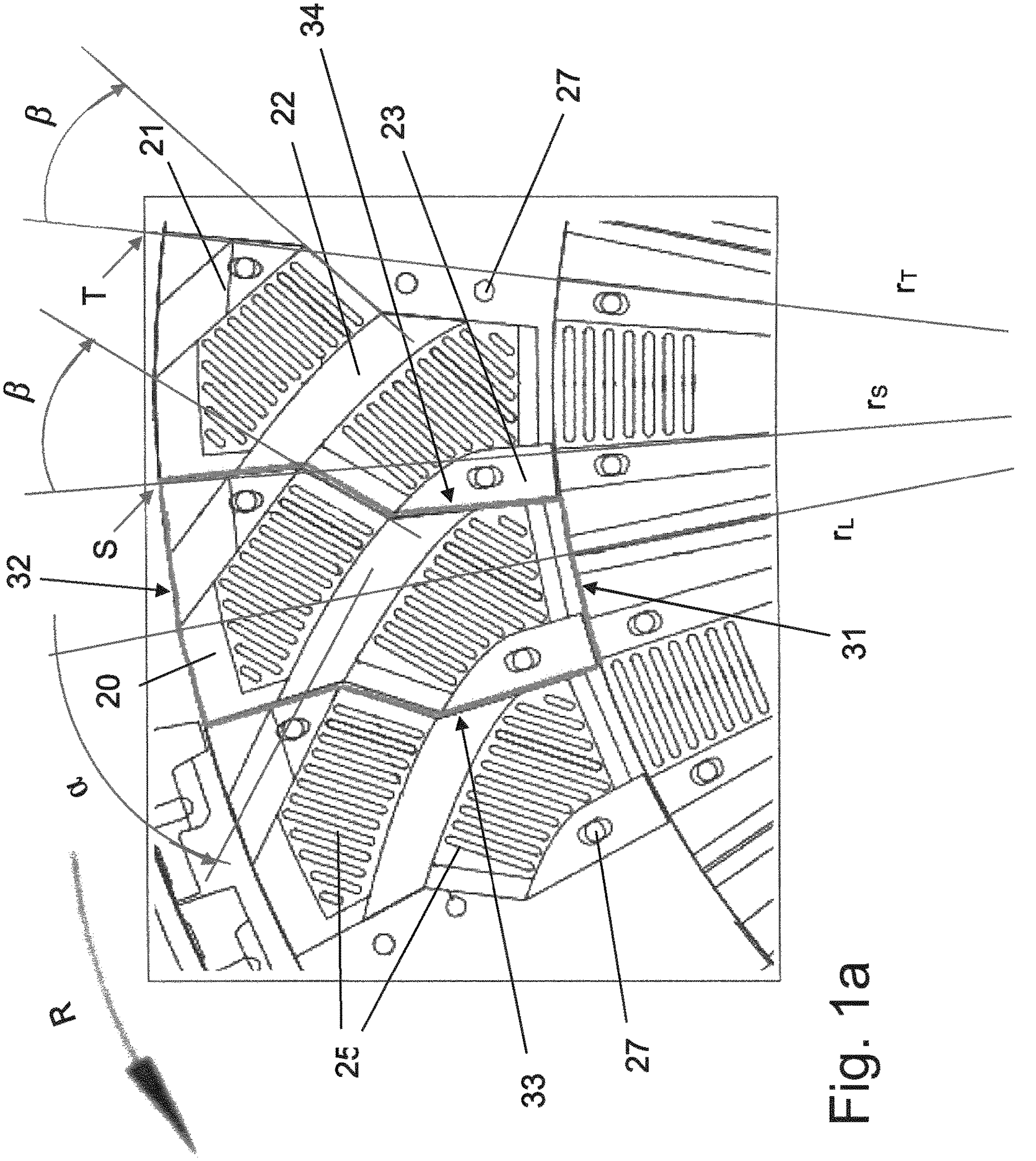
FIG. 1*a* schematically illustrates a portion of a pulp lifter carrying grate plates according to a first embodiment of the present invention.

Embodiments of the invention will now be described with reference to the aforementioned drawings.

In all of the drawings, like reference numerals refer to like parts.

Figure 1B:
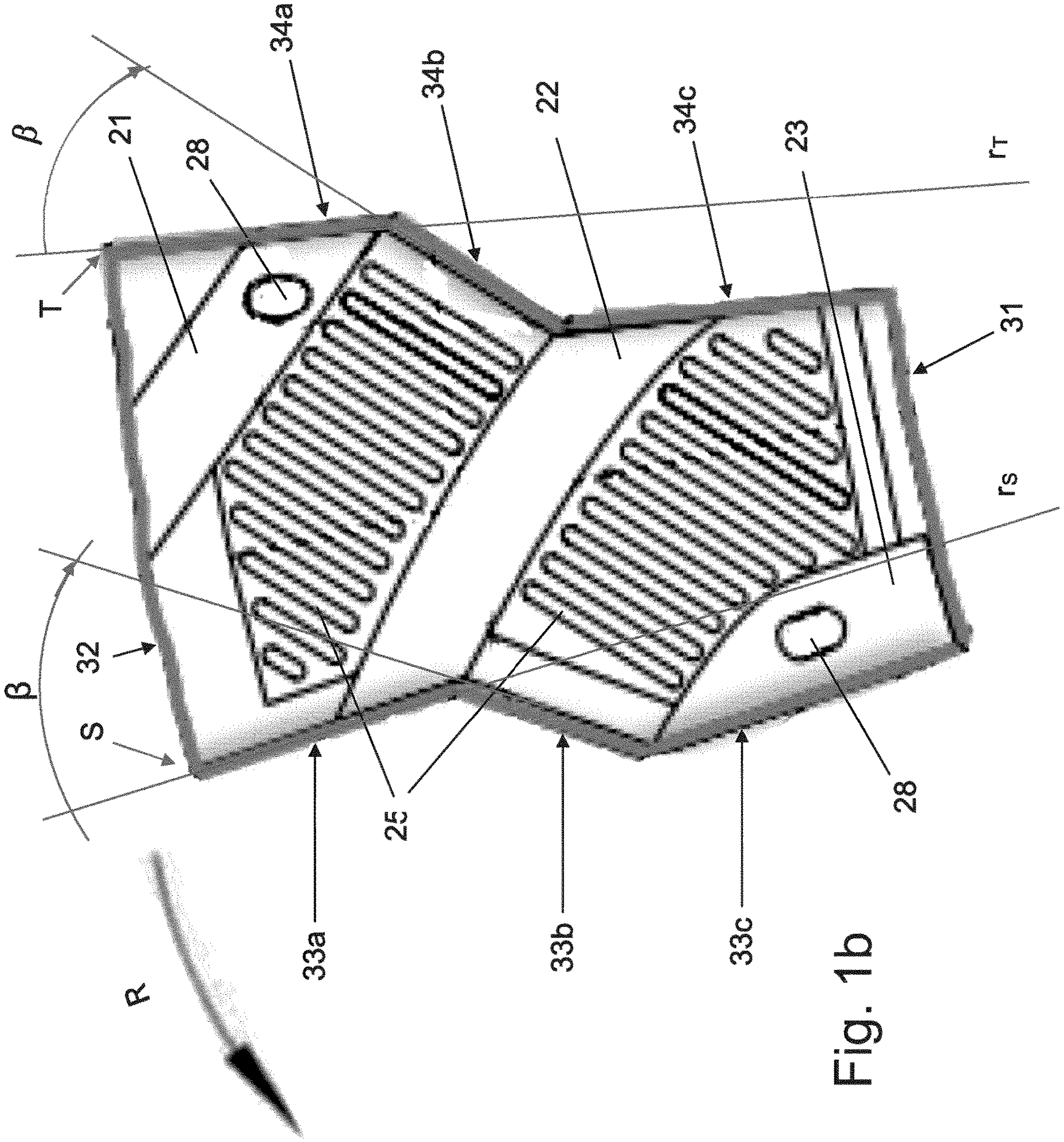
FIG. 1*b* illustrates one grate plate according to the first embodiment.
Figure 3:
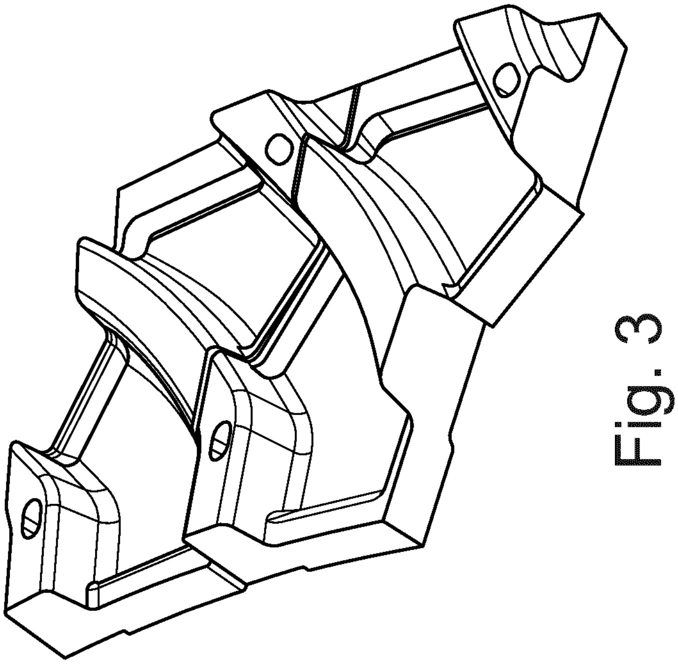
FIG. 3 is a perspective three-dimensional view of two of the grate plates of FIG. 1, wherein the slot-shaped apertures are not illustrated either.
Figure 2:
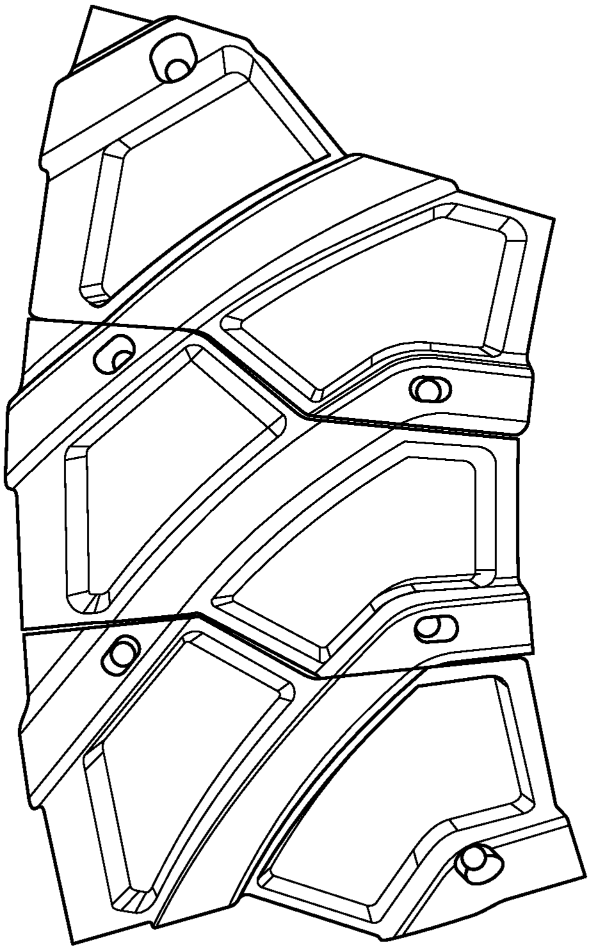
FIG. 2 is a three-dimensional view of the grate plates of FIG. 1, wherein the slot-shaped apertures are not illustrated.

FIG. 1*a* illustrates a portion of a pulp lifter of a grinding mill equipped with grate plates according to a first embodiment of the present invention. FIG. 1*b* shows one grate plate in a separate view. FIGS. 2 and 3 show grate plates as in FIG. 1 in a three-dimensional plan view and a perspective three-dimensional view respectively.

The grate plates are for use in a grinding mill, more specifically a rotating drum grinding mill. Grinding mills are used for processing hard solid material such that large solid material is ground into smaller pieces.

The grinding mill may be constituted essentially like the prior art grinding mill described further above with reference to FIG. 1. The mill comprises a cylindrical shell or drum arranged rotatably around its longitudinal axis extending in a horizontal direction. The material to be ground may be received into the cylindrical shell, for instance through a feed chute. The grinding takes place within the cylindrical shell by lifting and dropping the material to be ground inside the cylindrical shell. Lifter bars or lifter plates may be used for lifting the material inside the cylindrical shell. According to an embodiment, loose grinding elements, such as balls comprising for instance stone or metal material, may be provided inside the cylindrical shell to aid in grinding.

The grinding mill may comprise at least one inlet for receiving a continuous feed of material to be ground. The material to be ground may comprise for instance mineral ore. The grinding mill 3 may also comprise at least one outlet for continuous discharge of the ground material.

The ground material may comprise for instance ore slurry. The inlet(s) and the outlet(s) may be provided at the opposite ends of the cylindrical shell in the direction of the longitudinal axis of the cylindrical shell. Thus, a continuous grinding process may be provided by feeding material to be ground into the cylindrical shell or drum through the inlet(s), grinding the material to be ground while it is moved through the cylindrical shell and moved within the cylindrical shell by lifting and dropping the material to be ground on its way through the cylindrical shell, and discharging the ground material through the outlet(s) at the opposite end of the cylindrical shell.

The grinding mill further comprises a pulp lifter. The pulp lifter comprises at least one pulp lifter element provided between the grate and the discharger for guiding the ground material from the cylindrical shell to the discharger. Each of the pulp lifter elements is provided with a grate plate as shown in FIGS. 1*a* and 1*b*, comprising openings or apertures, slot-shaped in this embodiment, for passing through ground material particles of a predetermined size or smaller. In other words, the openings may be dimensioned in such a manner that particles of a predetermined size or smaller fit through the openings and may thus be moved towards the outlet of the mill, and particles that are larger than the predetermined size do not fit through the openings but are dropped back to the interior of the cylindrical shell for further grinding. Thereby the grate prevents particles larger than the predetermined size passing through the grate.

As a rule of thumb, each slot may have a length which corresponds to about 1.5 times the width of the slot.

The grinding mill may also comprise a discharger provided at the outlet end of the grinding mill for discharging the ground material through the outlet.

The disc-shaped or annulus-shaped pulp lifter may comprise a conical shape as is per se known in the art, wherein the grates are inclined at e.g. about 15 to 20° relative to a vertical plane. The pulp lifter may be arranged at the end of the cylindrical shell and to conform to the end of the cylindrical shell in such a manner, that the middle point of the pulp lifter may be arranged on the longitudinal axis of the cylindrical shell. The pulp lifter may be arranged rotatably in the grinding mill, such that the pulp lifter is rotatable together as one entity with the cylindrical shell about the longitudinal axis of the cylindrical shell.

More particularly, the pulp lifter may be arranged to lift the ground material passed through the grate plates to the outlet for discharging the ground material through the discharger, when the pulp lifter is arranged to rotate together with the cylindrical shell about the longitudinal axis of the cylindrical shell. Depending on the embodiment, the pulp lifter may be arranged to rotate, together with the cylindrical shell, in a clockwise or in a counterclockwise direction. In the pulp lifter, multiple outer pulp lifter elements are arranged in an annular array, and inner pulp lifter elements are arranged in an annular array inward of the outer pulp lifter elements. The pulp lifter structure further comprises dischargers in an annular array inward of the inner pulp lifter elements. A grate plate of the invention is attached to each outer pulp lifter. The grate plates collectively form a grate of the grinding mill.

The pulp lifter may comprise at least one outer pulp lifter element. Typically, a pulp lifter comprises multiple outer pulp lifter elements as shown. An outer pulp lifter element comprises a form of a sector or a truncated sector of a circle, and a number of such outer pulp lifter elements are arranged circumferentially side by side, whereby the outer pulp lifter elements form a disc-shaped or an annulus-shaped array. According to an embodiment, a pulp lifter may comprise 15 to 35 outer pulp lifter elements. According to another embodiment, a pulp lifter may comprise 18 to 32 outer pulp lifter elements, such as 24 to 32 outer pulp lifter elements.

Depending on the embodiment, all the outer pulp lifter elements in a pulp lifter may be similar to one another, or a pulp lifter may comprise different types of outer pulp lifter elements.

FIG. 1*a* illustrates a part of an annular array of pulp lifters equipped with grate plates 20 according to a first embodiment of the invention. The grate plates 20 are attached to surfaces of the pulp lifters facing the interior of the drum mill. In the illustrated embodiment, a number of 32 identical grate plates 20 are attached to the pulp lifters in an annular array.

Each grate plate has an external shape which is substantially trapezoidal, with a radially inner edge 31, a radially outer edge 32, a leading side edge 33 (facing the direction of rotation of the drum) and a trailing side edge 34. The grate plates 20 in the annular array together form a grate of the mill which rotates together with the pulp lifter.

The radially inner and outer side edges 231, 232 of the grate plate 220 are very slightly curved so as to be concentric to each other. The grate plate thereby assumes the shape of a segment of a circle. The grate plates 20 are configured to be installed in the mill so that the edge 32 is radially outward of the edge 31 and is therefore closer to the inner circumference of the drum of the mill.

The grate plates 20 are provided with through openings which in this and other embodiments have the form of slots 25. In operation, as the mill rotates and an outer pulp lifter approaches the 6 o'clock position, slurry enters the inlet chamber through the openings 25 in the grate plate 20.

On the surfaces provided to face the interior of the mill, the grate plates 20 are further provided with lifter bars. The lifter bars in this embodiment have a curved configuration. Each lifter bar is sectionalized into three sections distributed over adjacent grate plates 20 so that a radially outermost section 21 of the lifter bar is disposed on a first grate plate; a central main section 22 of the lifter bar is disposed on a second grate plate 20 adjacent to the first grate plate 20; and a radially innermost section 23 of the same lifter bar is disposed on a third grate plate 20 adjacent to the second grate plate 20. When the three grate plates 20 are placed adjacent to each other in the annular array, a lifter bar is assembled from the three sections 21-23 on three adjacent grate plates 20. At the same time, each one of the identical grate plates 20 comprises a radially outermost section 21 of a first lifter bar, a central main section 22 of a second lifter bar, and a radially innermost section 23 of a third lifter bar.

The radially outer part of the lifter bar is inclined, relative to a radial line rL of the annular array intersecting the lifter bar, in the direction of rotation R of the grate. An angle of inclination of the outer portion of the lifter bar relative to said radial line is indicated "a" in the drawings. The radially inner end of the lifter bar, encompassing essentially the first section 21 of the lifter bar, is aligned in a radial direction. A curved intermediate portion of the lifter bar is provided to connect the radially extending inner end and the outer portion of the lifter bar extending at the angle $\alpha$.

In this embodiment, the grate plates 20 are further provided with mounting holes 28 to cooperate with mounting bolts 27 to fix the grate plates 20 to the pulp lifters.

Figure 9:
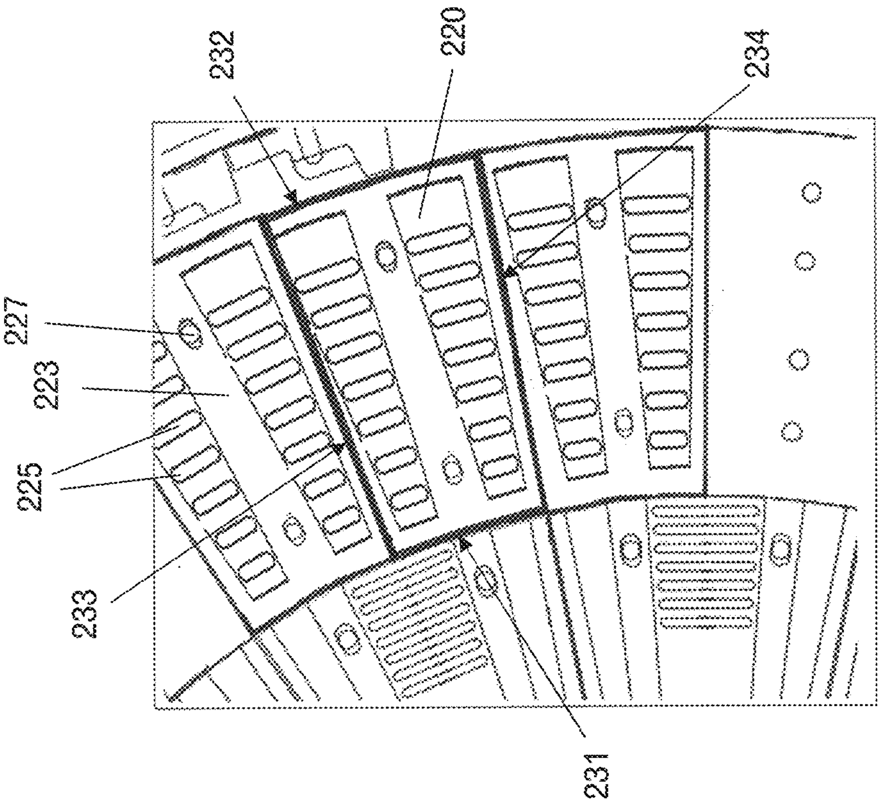
Fig. 9 (prior art)
FIG. 9 is a partial plane view of grate plates of a prior art pulp lifter having straight lifter bars.
Figure 8:
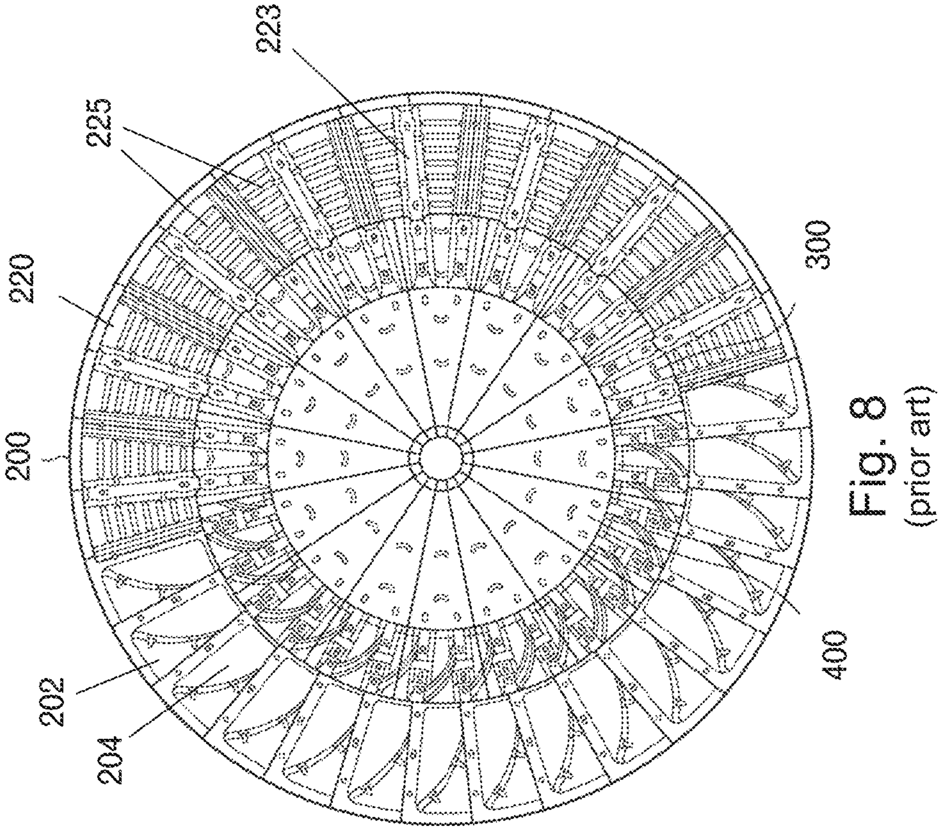
Fig. 8 (prior art)
FIG. 8 is a plane view of a prior art pulp lifter carrying grate plates.
Figure 11:
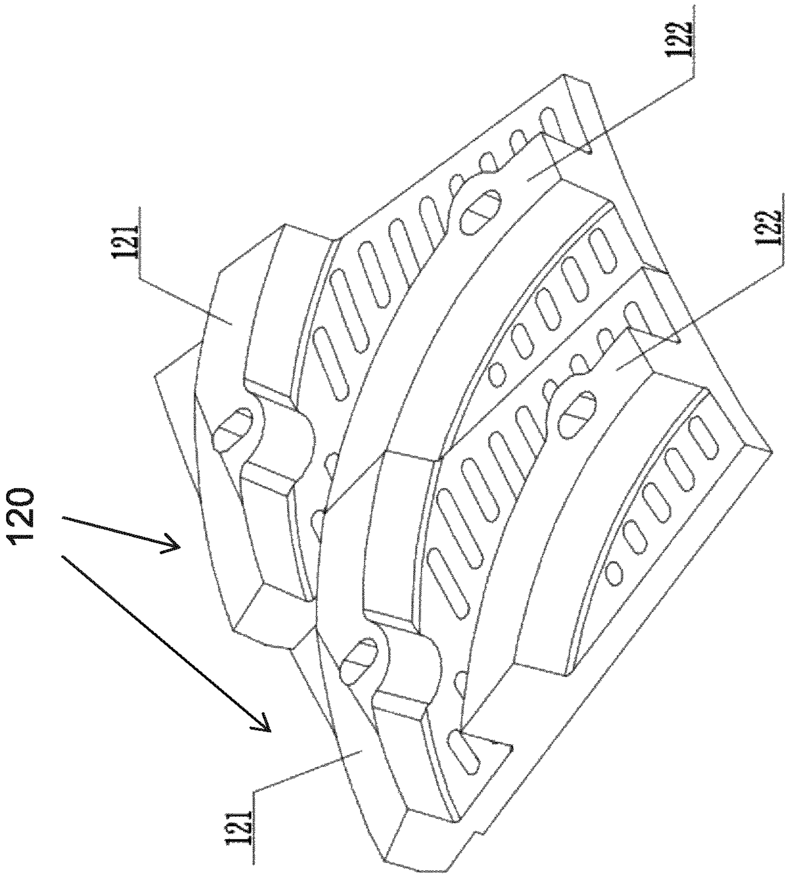
Fig. 11 (prior art)
FIG. 11 is a perspective view of two prior art grate plates with curved lifter bar sections complementing to form lifter bars.
Figure 10:
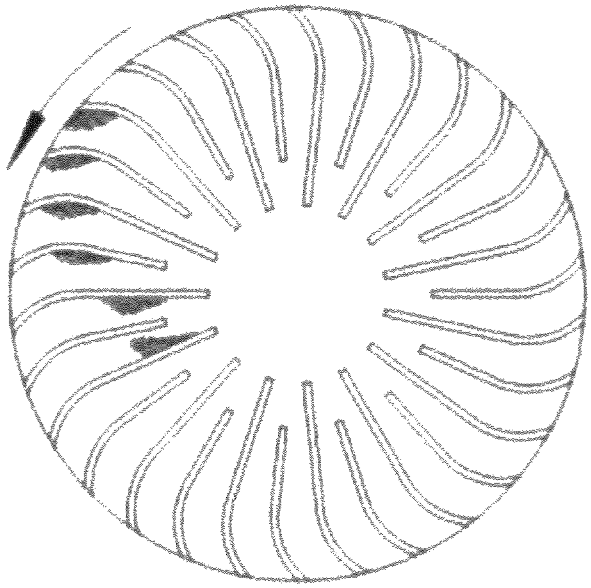
Fig. 10 (prior art)
FIG. 10 is a plane view of a prior art pulp lifter having partially curved lifter bars.

A comparison between FIG. 1*a* and FIG. 9 shows that despite the different arrangement of the lifter bars and the different configuration of the side edges of the grate plate of the invention compared to the prior art grate plate, the mounting holes 28 in the grate plate 20 of the invention may formed at the same positions as in the prior art grate plate 220, so that an array of prior art grate plates 220 can be readily replaced by an array of the novel grate plates 20 using the same mounting bolts 27.

The side edges 33, 34 of the grate plate 20 of the invention are configured to optimize the area available to place the slots 25.

Specifically, as also apparent from FIG. 1*b* which shows one grate plate 20 of the illustrated embodiment, the leading side edge 33 of the grate plate comprises three sections 33*a*, 33*b* and 33*c*, and the trailing side edge 34 of the grate plate equally comprises three sections 34*a*, 34*b* and 34*c*. At the leading side edge, radially innermost and outermost sections 33*a* and 33*c* essentially extend in a radial direction, whereas the intermediate section 33*b* of the leading side edge is inclined relative to a radial like rS. The radial line rS is a radial line of the annular array formed by several adjacent grate plates 20 (see FIG. 1*a*), and specifically the radial line intersecting a point S where the leading side edge 33 of the grate plate 20 meets the radially outer edge 32 thereof. The inclination of the intermediate section 33*b* of the leading side edge relative to said line rS is by an angle indicated "B" in the drawings.

In accordance with the invention, the inclination of the intermediate section 33*b* of the leading side edge by the angle "B" is in a direction which is opposite the direction of inclination of the lifter bar by the angle "a".

Similarly, at the trailing side edge, radially innermost and outermost sections 34*a* and 34*c* of the trailing side edge essentially extend in a radial direction, whereas the intermediate section 34*b* of the trailing side edge is inclined relative to a radial like rT. The radial line rT is a radial line of the annular array formed by several adjacent grate plates 20 (see FIG. 1*a*), and specifically the radial line intersecting a point T where the trailing side edge 34 of the grate plate 20 meets the radially outer edge 32 thereof. The inclination of the intermediate section 34*b* of the trailing side edge relative to said line rT is by the angle "B" since the leading and trailing side edges have complimentary shapes. In accordance with the invention, the inclination of the intermediate section 34*b* of the trailing side edge by the angle "B" is in a direction which is opposite the direction of inclination of the lifter bar by the angle "a".

Further in view of the complimentary shapes of the edges 33, 34, the radially outermost section 33*a* of the leading side edge has the same length as the radially outermost section 34*a* of the trailing side edge; the intermediate section 33*b* of the leading side edge has the same length as the intermediate section 34*b* of the trailing side edge; and the radially innermost section 33*c* of the leading side edge has the same length as the radially innermost section 34*c* of the trailing side edge.

Due to this specific shape of the leading and trailing side edges of the grate plate 20, the area available for placing the slots 25 is optimized. In the present embodiment, each grate plate 20 comprises to either side of the central section 22 of the lifter bar an area of essentially equal size to place the slots 25.

The transitions between the three sections 33*a*, 33*b* and 33*c* of the leading side edge 33 of the grate plate and between the three sections 34*a*, 34*b* and 34*c* of the trailing side edge 34 of the grate plate could be rounded rather than angular as shown.

FIGS. 2 and 3 are further views of grate plates of the first embodiment wherein the slots 25 are not illustrated. However, it is apparent from these perspective views that each grate plate is made from an essentially plate-shape substrate formed with a reinforcing frame about its circumference for edge protection and stiffening. In this embodiment, the reinforcing frame extends about the entire circumference of the grate plate, i.e. along the radially inner edge, leading side edge, radially outer edge and trailing side edge. The reinforcing frame projects from a substrate by a height which is smaller than the height by which the lifter bars extend from the substrate. In an example, the reinforcing frame projects from a substrate by up to 100 mm, in particular up to 70 mm and more particularly from 30 mm to 70 mm, such as e.g. about 60 to 70 mm or about 30 to 35 mm. The reinforcing frame could also extend up to approximately the same height as the lifter bars though. In other embodiments, the reinforcing frame is dispensed with partially or entirely.

Figure 4:
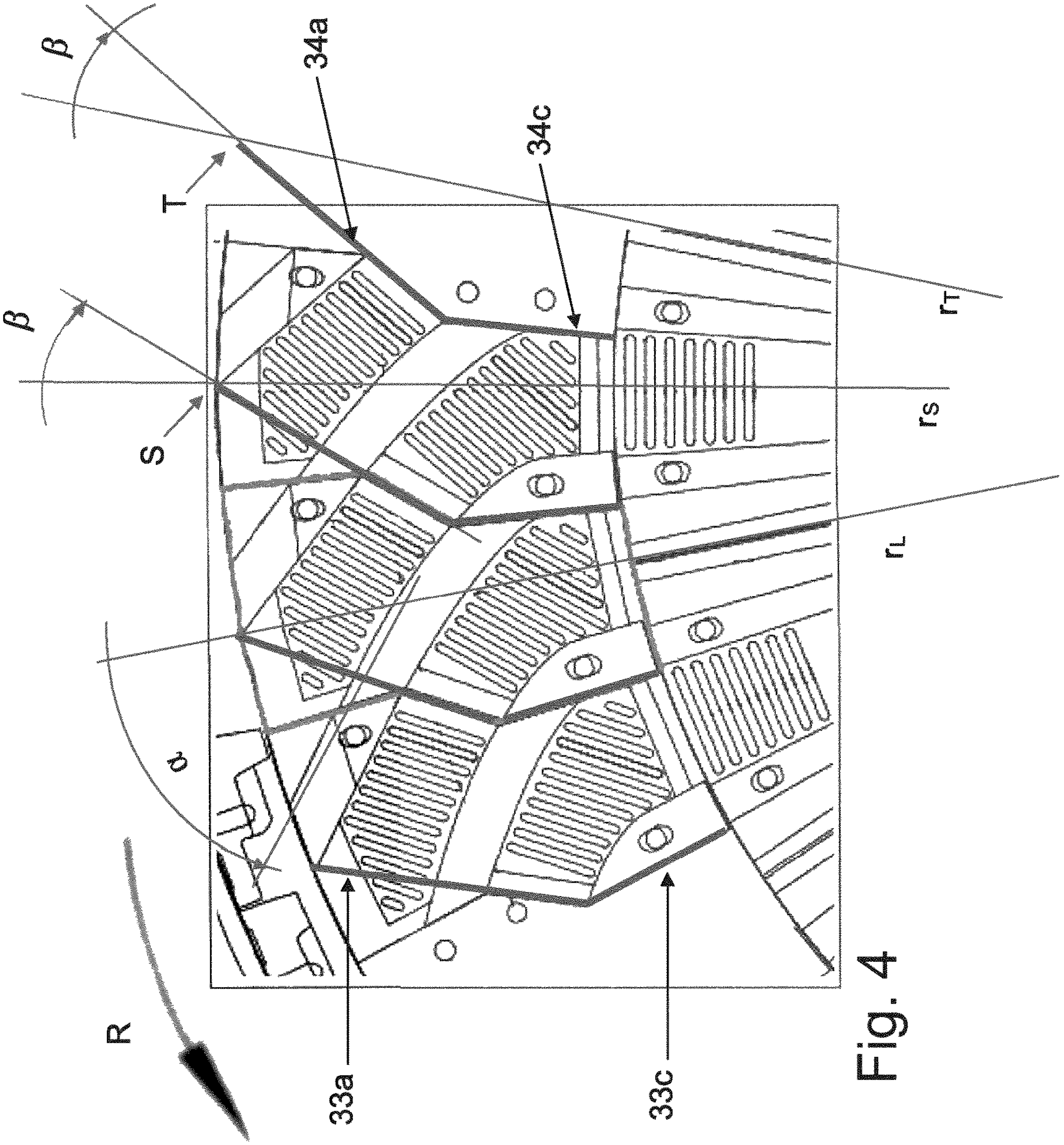
FIG. 4 schematically illustrates a portion of a pulp lifter carrying three grate plates according to a second embodiment of the present invention.
Figure 5:
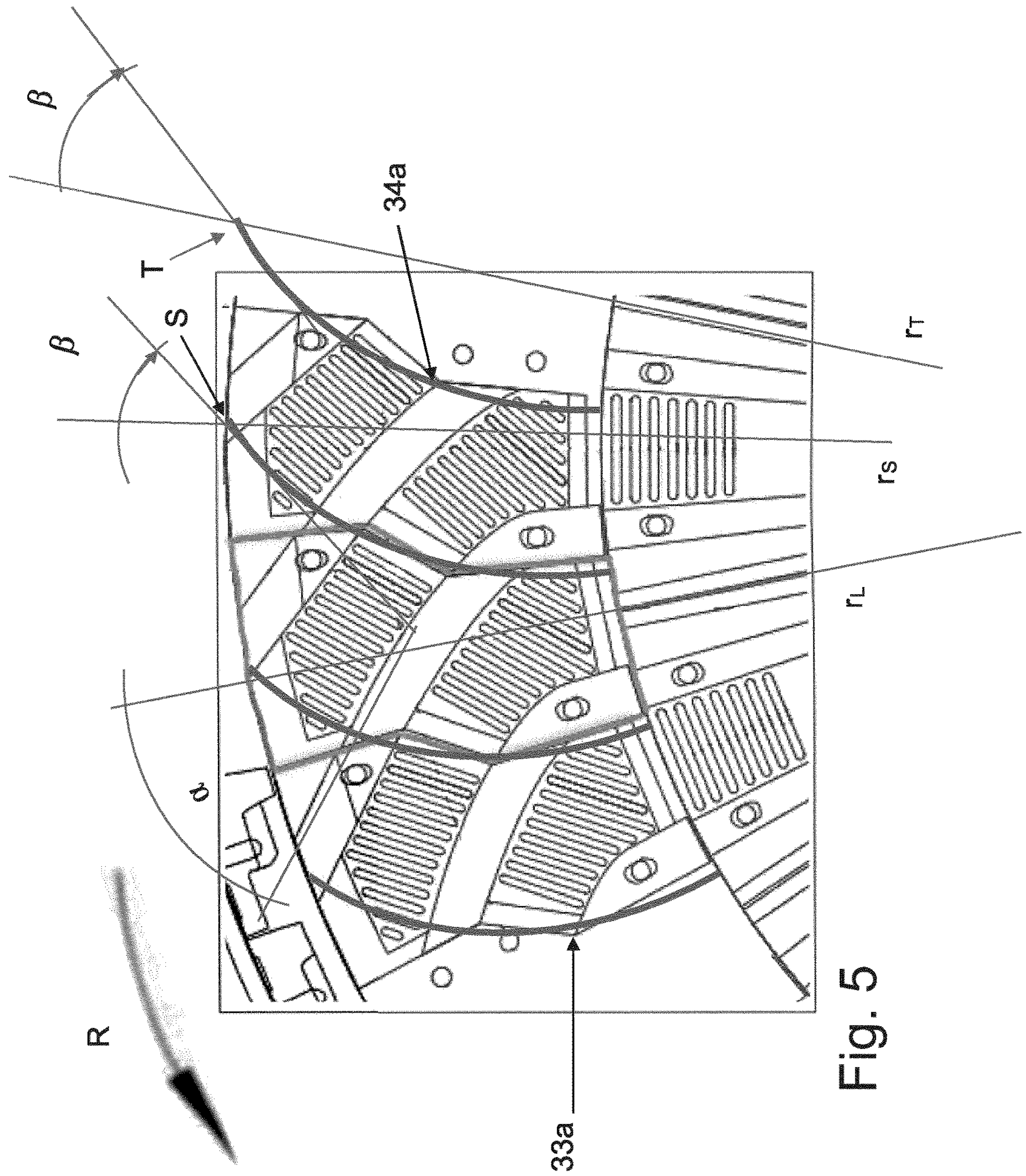
FIG. 5 schematically illustrates a portion of a pulp lifter carrying grate plates according to a third embodiment of the present invention.
Figure 6:
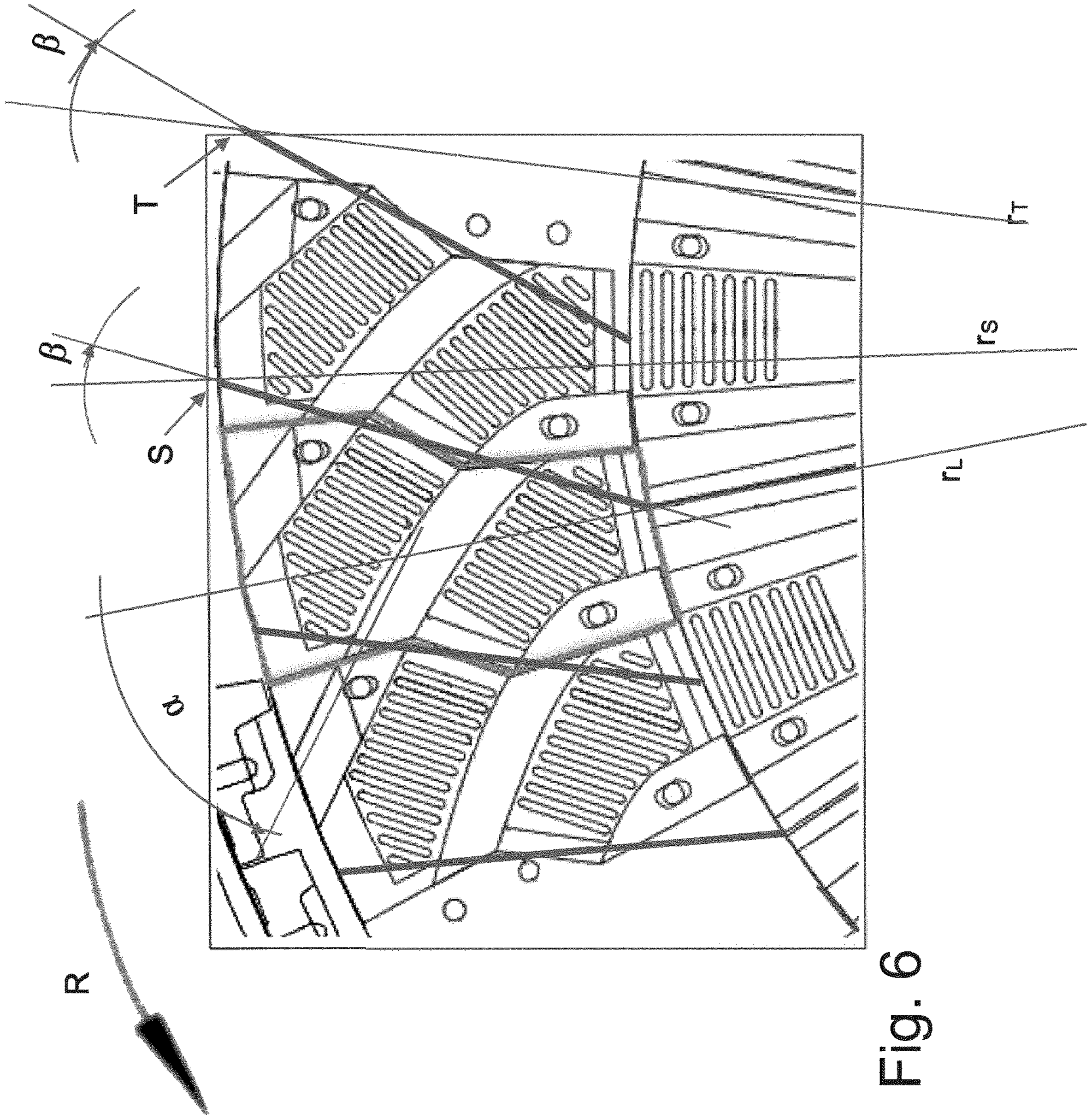
FIG. 6 schematically illustrates a portion of a pulp lifter carrying grate plates according to a fourth embodiment of the present invention.
Figure 7:
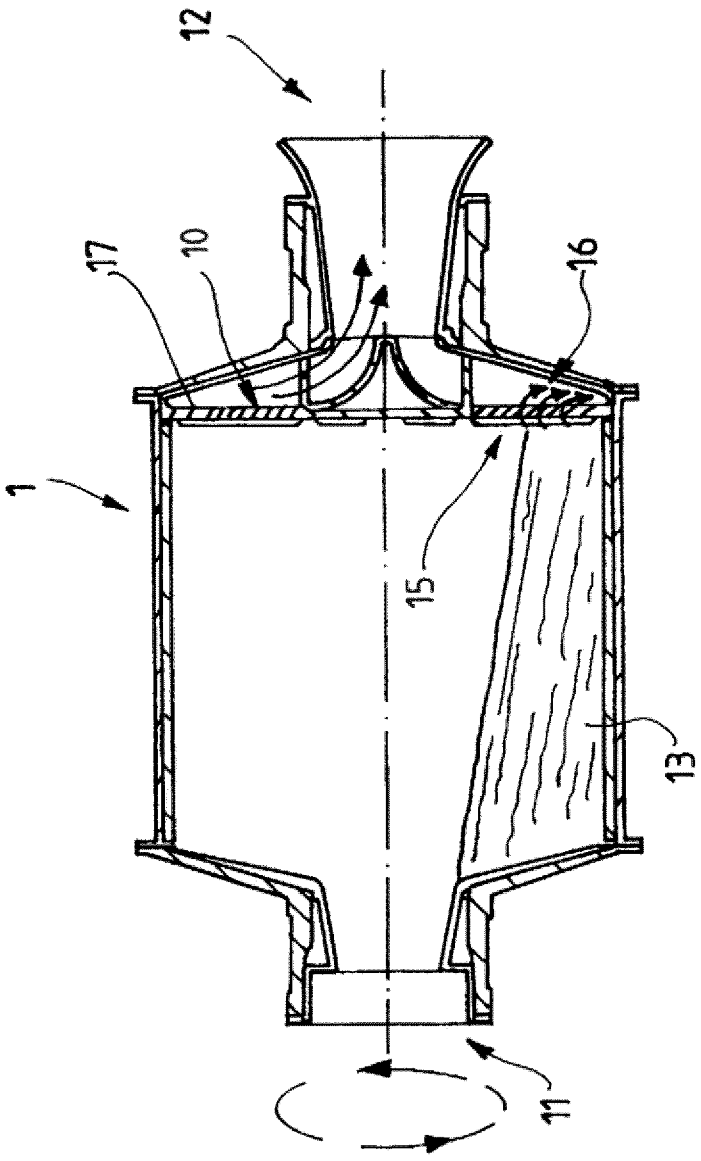
Fig. 7 (prior art)
FIG. 7 is a cross-sectional view of a conventional prior art grate discharge mill.

FIGS. 4, 5 and 6 show further embodiments of grate plates according to the invention:

The second embodiment illustrated in FIG. 4 differs from the first embodiment in that the leading and trailing side edges do not have three sections each as in the first embodiment, but only two sections each, i.e. a respective radially outer section 33*a*/34*a* and a respective radially inner section 33*c*/34*c*. The radially outer section 33*a* of the leading side edge has the same length as the radially outer section 34*a* of the trailing side edge, and the radially inner section 33*c* of the leading side edge has the same length as the radially inner section 34*c* of the trailing side edge. In this embodiment, the inner sections 33*c*, 34*c* extend essentially in a radial direction, whereas the outer sections 33*a*, 34*a* of the leading and trailing edges form an angle "B" relative to the respective radial line rS, rT running through the respective point S, T where the respective side edge 33, 34 meets the radially outer edge 32 of the grate plate 20.

In accordance with the invention, the inclination of the outer sections 33*a*, 34*a* of the leading and trailing side edges by the angle "B" is in a direction which is opposite the direction of inclination of the lifter bar by the angle "a".

The third embodiment illustrated in FIG. 5 differs from the first and second embodiments in that the leading and trailing side edges 33, 34 each have a continuously curved shape. At the intersection S of the leading side edge 33 and the radially outer edge 32, the tangent to the leading side edge 33 forms an angle "B" relative to the radial line rS running through the point of intersection S. At the intersection T of the trailing side edge 34 and the radially outer edge 32, the tangent to the trailing side edge 34 forms an angle "B" relative to the radial line rT running through the point of intersection T.

In accordance with the invention, the inclination of the tangents to the leading and trailing side edges by the angle "B" is in a direction which is opposite the direction of inclination of the lifter bar by the angle "a".

Finally, the fourth embodiment illustrated in FIG. 6 differs from the first, second and third embodiments in that the leading and trailing side edges 33, 34 each have the shape of a continuous straight line. At the intersection S of the leading side edge 33 and the radially outer edge 32, the leading side edge 33 forms an angle "B" relative to the radial line rS running through the point of intersection S. At the intersection T of the trailing side edge 34 and the radially outer edge 32, the trailing side edge 34 forms an angle "B" relative to the radial line rT running through the point of intersection T. In accordance with the invention, the inclination of the leading and trailing side edges by the angle "B" is in a direction which is opposite the direction of inclination of the lifter bar by the angle "a".

In a grate plate according to the invention, the size of the area available to place the slots 25 is optimized compared to prior art grate plates. A larger area to place the slots, and a corresponding larger open area formed by the slots, prevents ground material from building up inside the mill and a pooling of water inside the mill, and also results in a reduced wear of the grate plates and the slurry pockets in the pulp lifter.

While several embodiments of the invention have been described in detail above, the invention is not restricted to these embodiments, and various modifications are encompassed by the scope of the invention as defined by the appended claims.

To give an example, the embodiments above all use essentially the same type of curved lifter bars wherein each lifter bar is formed from three sections distributed over three adjacent grate plates, and the three sections all have the same height. Other configurations are possible though, wherein the lifter bars could in principle also have varying heights.

Furthermore, the embodiments above all relate to grate plates attached to outer pulp lifter elements, and in practice, grate plates with slots are also often used in radially outer portion of the mill's discharge end where the pressure is greatest, whereas blind plates without slots or other apertures are used in radially inner areas of the discharge end. However, in principle the invention is equally applicable to grate plates for inner pulp lifter elements of pulp lifters having outer and inner pulp lifter elements, or for sole pulp lifter elements of pulp lifters having only one circular array of pulp lifter elements.

Also, while the grate plates are illustrated for use with a pulp lifter at a discharge end of a grinding mill, they could in principle also be used for a so-called diaphragm separating two areas of a continuous mill.

What is claimed is:

1. A grate plate for use with a pulp lifter at a discharge end of a grinding mill having a cylindrical drum with an interior, the grate plate comprising:

an outer edge, an inner edge, a leading side edge and a trailing side edge, wherein the leading side edge and the trailing side edge have complementary shapes so that a series of grate plates can be mounted to the pulp lifter in a circular or annular array, with the leading side edge of each grate plate being adjacent the trailing side edge of an adjacent grate plate in the array;

openings for passing through ground material particles of a predetermined size or smaller from the interior of the cylindrical drum towards the pulp lifter; and on a surface configured to face the interior of the cylindrical drum, one or more sections of lifter bars arranged so that the lifter bar sections on a number of adjacent grate plates complement each other to form lifter bars, wherein the lifter bar sections are shaped so that at least portions of the resulting lifter bars are inclined or curved in a first circumferential direction of the array relative to a radial line of the array intersecting the respective lifter bar or lifter bar portion, wherein at least portions of the complementary leading and trailing side edges of the grate plate are inclined or curved in a second circumferential direction of the array relative to a radial line of the array running through a point of intersection of the respective side edge with the outer edge, wherein the second circumferential direction is opposite the first circumferential direction.

2. The grate plate of claim 1, wherein the grate plate has a shape of a trapezoid, of a segment of a circle, or of a segment of an annulus.

3. The grate plate of claim 1, wherein the inner edge is shorter than the outer edge.

4. The grate plate of claim 1, wherein the leading side edge and the trailing side edge are each configured from a first section adjacent to the outer edge of the grate plate, a second section adjacent to the inner edge of the grate plate, and a third section between the first and second sections, wherein the first and/or the second sections of the side edges extend in a radial direction, and the intermediate sections of the side edges are inclined or curved in said second circumferential direction of the array relative to said radial line.

5. The grate plate of claim 1, wherein the leading side edge and the trailing side edge are each configured from a first section adjacent to the outer edge of the grate plate and a second section adjacent to the inner edge of the grate plate, wherein the first sections of the side edges are inclined or curved in said second circumferential direction of the array relative to said radial line, whereas the second sections of the side edges extend in a radial direction.

6. The grate plate of claim 1, the grate plate comprising a first lifter bar section forming part of a first lifter bar of the array, a second lifter bar section forming part of a second lifter bar of the array, and a third lifter bar section forming part of a third lifter bar of the array.

7. The grate plate of claim 6, further comprising an array of apertures in an area between the first and the second lifter bar section, and another array of apertures in an area between the second and the third lifter bar section.

8. The grate plate of claim 7, wherein the arrays of apertures have an equal size and/or an equal number of apertures.

9. The grate plate of claim 1, wherein the first circumferential direction in which the lifter bars are curved or inclined is a rotational direction of the pulp lifter.

10. A plurality of grate plates for use with a pulp lifter at a discharge end of a grinding mill having a cylindrical drum with an interior, each of the plurality of grate plates comprising:

an outer edge, an inner edge, a leading side edge and a trailing side edge, the plurality of grate plates having complimentary side edges having complementary shapes so that the plurality of grate plates can be mounted to the pulp lifter to form a circular or annular array, with the leading side edge of each grate plate being adjacent the trailing side edge of an adjacent grate plate in the array;

openings for passing through ground material particles of a predetermined size or smaller from the interior of the cylindrical drum towards the pulp lifter; and on a surface configured to face the interior of the cylindrical drum, one or more sections of lifter bars arranged so that the lifter bar sections on a number of adjacent grate plates complement each other to form lifter bars, wherein the lifter bar sections are shaped so that at least portions of the resulting lifter bars are inclined or curved in a first circumferential direction of the array relative to a radial line of the array intersecting the respective lifter bar or lifter bar portion, wherein at least portions of the complementary leading and trailing side edges of the plurality of grate plates are inclined or curved in a second circumferential direction of the array relative to a radial line of the array running through a point of intersection of the respective side edge with the outer edge, wherein the second circumferential direction is opposite the first circumferential direction.

11. The plurality of grate plates according to claim 10 wherein the grate plates all have an identical shape.

12. A pulp lifter for use at a discharge end of a grinding mill having a cylindrical drum with an interior, the pulp lifter comprising:

a circular or annular array of pulp lifter elements; and a grate plate attached to each of the pulp lifter elements, each of the grate plates comprising:

an outer edge, an inner edge, a leading side edge and a trailing side edge, wherein the leading side edge and the trailing side edge have complementary shapes so that a series of grate plates can be mounted to the pulp lifter in a circular or annular array, with the leading side edge of each grate plate being adjacent the trailing side edge of an adjacent grate plate in the array;

openings for passing through ground material particles of a predetermined size or smaller from the interior of the cylindrical drum towards the pulp lifter; and on a surface configured to face the interior of the cylindrical drum, one or more sections of lifter bars arranged so that the lifter bar sections on a number of adjacent grate plates complement each other to form lifter bars, wherein the lifter bar sections are shaped so that at least portions of the resulting lifter bars are inclined or curved in a first circumferential direction of the array relative to a radial line of the array intersecting the respective lifter bar or lifter bar portion, wherein at least portions of the complementary leading and trailing side edges of the grate plates are inclined or curved in a second circumferential direction of the array relative to a radial line of the array running through a point of intersection of the respective side edge with the outer edge, wherein the second circumferential direction is opposite the first circumferential direction.

13. The pulp lifter of claim 12 further comprising at least two circular or annular arrays of pulp lifter elements wherein the grate plates are attached to the pulp lifter elements of a radially outer array of pulp lifter elements.

14. A grinding mill comprising:

a cylindrical drum arranged rotatably around its longitudinal axis;

at least one inlet for receiving a continuous feed of material to be ground;

at least one outlet for continuous discharge of ground material;

a pulp lifter for guiding the ground material from the cylindrical drum to the outlet, the pulp lifter comprising a circular or annular array of pulp lifter elements; and a grate plate attached to each of the pulp lifter elements, each grate plate comprising:

an outer edge, an inner edge, a leading side edge and a trailing side edge, wherein the leading side edge and the trailing side edge have complementary shapes so that a series of grate plates can be mounted to the pulp lifter in a circular or annular array, with the leading side edge of each grate plate being adjacent the trailing side edge of an adjacent grate plate in the array;

openings for passing through the ground material particles of a predetermined size or smaller from the interior of the cylindrical drum towards the pulp lifter; and on a surface configured to face the interior of the cylindrical drum, one or more sections of lifter bars arranged so that the lifter bar sections on a number of adjacent grate plates complement each other to form lifter bars, wherein the lifter bar sections are shaped so that at least portions of the resulting lifter bars are inclined or curved in a first circumferential direction of the array relative to a radial line of the array intersecting the respective lifter bar or lifter bar portion, wherein at least portions of the complementary leading and trailing side edges of the grate plate are inclined or curved in a second circumferential direction of the array relative to a radial line of the array running through a point of intersection of the respective side edge with the outer edge, wherein the second circumferential direction is opposite the first circumferential direction.

15. The grinding mill of claim 14, wherein the longitudinal axis of the drum extends in a horizontal direction.

* * * * *